Aug. 18, 1931.  A. C. GETZ  1,819,889
SPEED CONTROL MECHANISM
Filed May 18, 1928   2 Sheets-Sheet 1
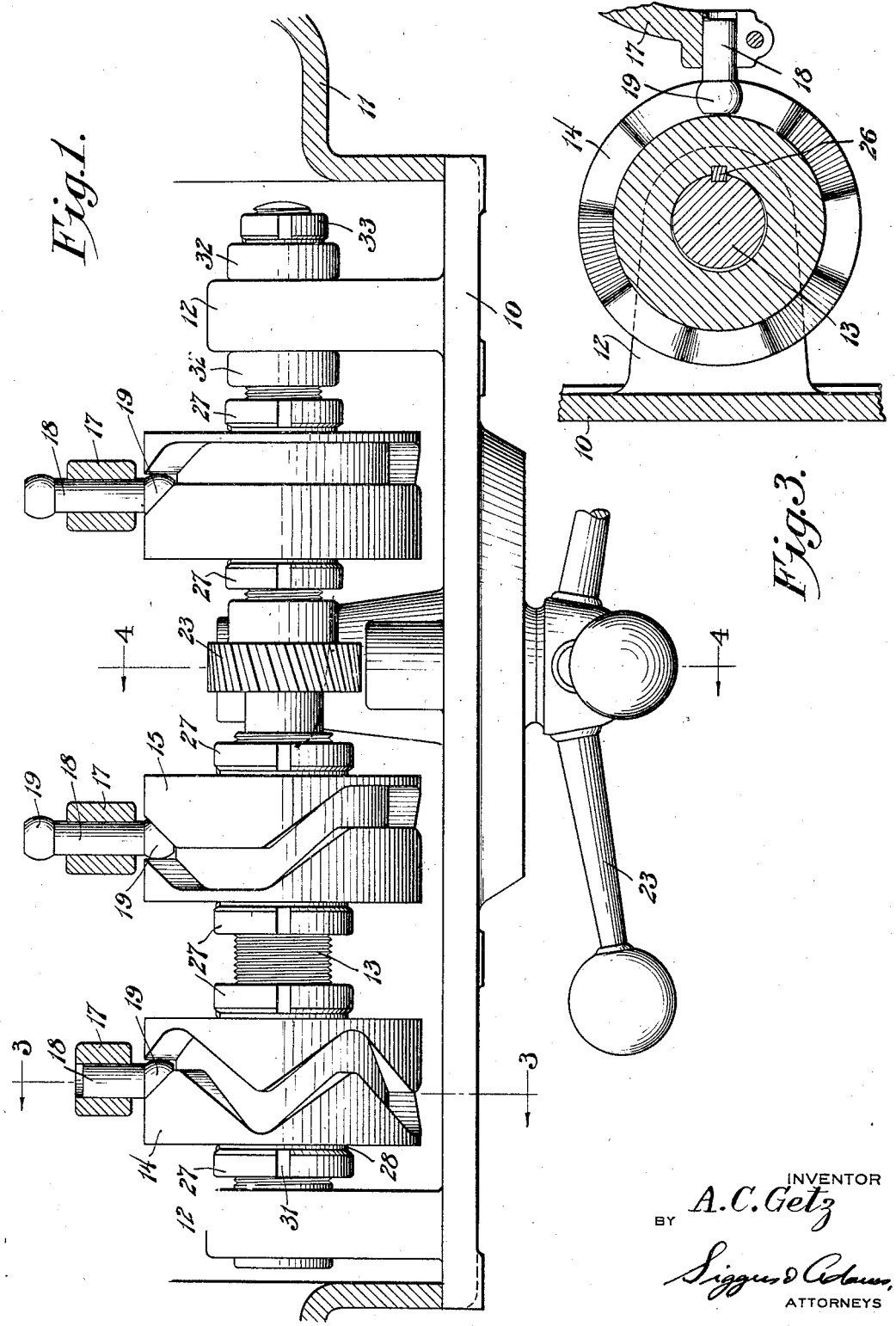
INVENTOR
A.C.Getz
BY
*Siggers & Adams*
ATTORNEYS Aug. 18, 1931.  A. C. GETZ  1,819,889
SPEED CONTROL MECHANISM
Filed May 18, 1928   2 Sheets-Sheet 2
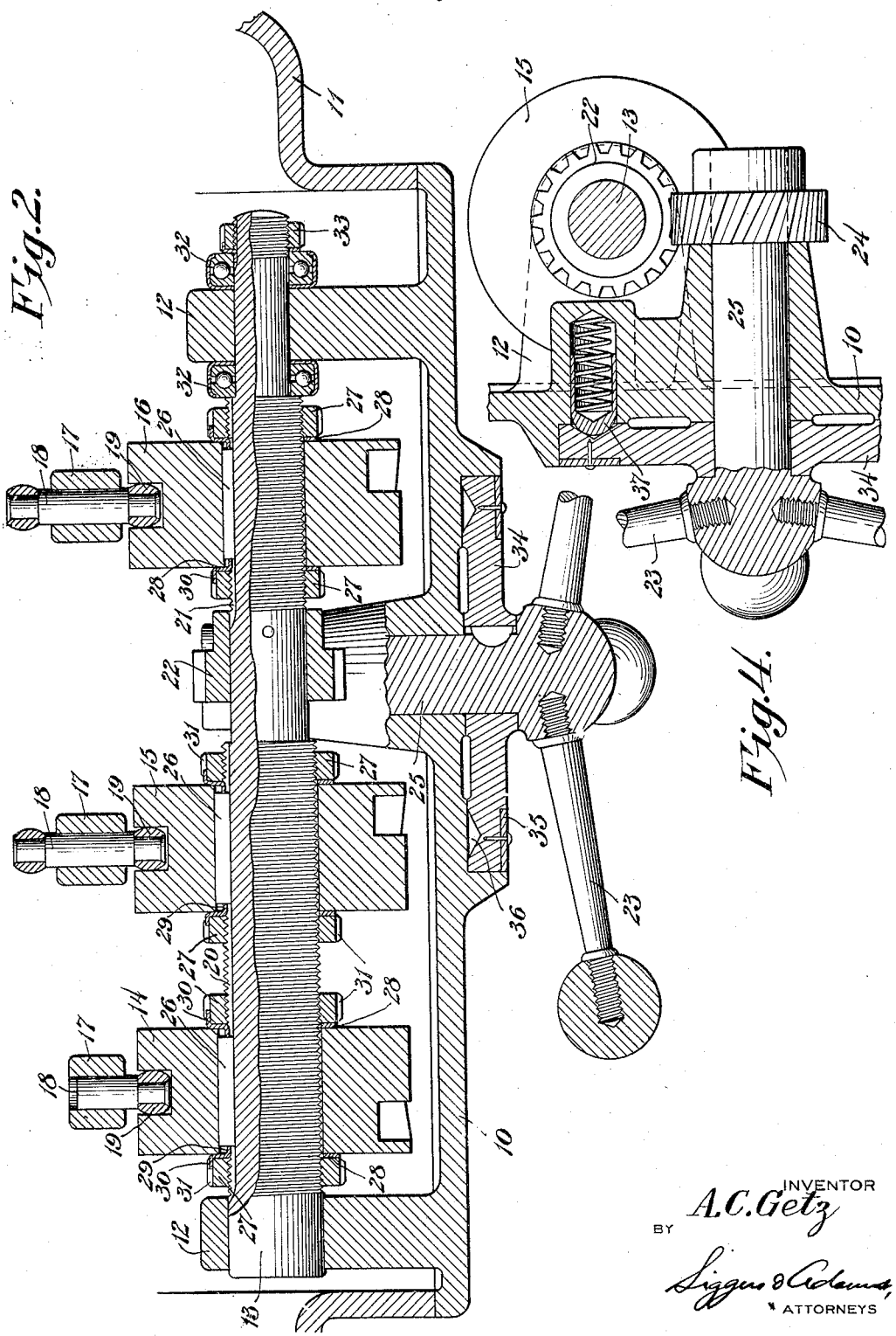
INVENTOR
A.C.Getz
BY
ATTORNEYS Patented Aug. 18, 1931

1,819,889

UNITED STATES PATENT OFFICE

ALFRED C. GETZ, OF SIDNEY, OHIO

SPEED CONTROL MECHANISM

Application filed May 18, 1928. Serial No. 278,833.

This invention relates to mechanism for controlling the operation of a series of change speed units and, among other objects, aims to provide an improved controller for lathes or other machine tool mechanisms such as that shown in my co-pending application, Serial Number 144,779, filed October 28, 1926, entitled Changeable speed gear mechanism, wherein a single hand wheel or lever is connected and arranged to shift a plurality of clutches to get any desired speed ratio without stopping the lathe.

In the accompanying drawings:

Fig. 1 is a top plan view of a controller unit embodying the invention and showing it applied to a lathe head, which is shown partly in section;

Fig. 2 is a horizontal sectional view through the controller cam shaft, parts being shown in elevation;

Fig. 3 is a fragmentary sectional view taken on the line 3—3 of Fig. 1; and

Fig. 4 is a fragmentary sectional view taken on the line 4—4 of Fig. 1.

Referring particularly to the illustrative embodiment of the invention shown in the drawings, the improved control mechanism is there shown as constituting a unit which is associated with the front or face plate 10 of a lathe head 11 having gearing like that shown in my co-pending application.

As shown in Figs. 1 and 2, the face plate 10 preferably has integral ears or brackets 12 to provide journal bearings for the controlling cam shaft 13 which carries a plurality of grooved cams 14, 15 and 16. Herein, only three such cams are shown but any desired number may be employed, and each of the cams is connected to operate a clutch arm or lever 17 by means of a pin 18 having a ball-like sleeve 19 working in the cam groove. The whole arrangement is such that, by turning the shaft and the cams, all of the desired speed shifts are accomplished.

It will be readily understood that the cams must be very accurately adjusted on and properly secured to the shaft 13 in order to shift the clutch levers for a number of different speeds. Herein, the shaft is shown as being machined in three steps having the left hand end in Figs. 1 and 2 larger than the right hand end.

The large left end of the shaft is threaded and has a longitudinal key-way 20. The two cams 14 and 15 may be slipped on the shaft and keyed thereto. The shaft is reduced in diameter to receive the cam 16 also on a screw threaded portion which has a longitudinal key-way 21 aligned with the key-way 20. Between the two threaded portions there is shown a smooth portion to receive a worm wheel or other suitable gear 22 secured thereon and adapted to be operated by the hand lever or wheel 23 having a worm or gear 24 carried on its shaft 25 and meshing with the gear 23.

To secure each of the cams on the shaft they are first slipped over the right end and keyed approximately in their proper positions by means of short keys 26. On opposite sides of each cam is an adjusting nut 27 and a lock washer 28 having a struck out tongue 29 bent longitudinally in the key-way and abutting the end of the key 26, while the outer periphery of the washer has a projecting finger 30 adapted to be bent over the nut after it is adjusted and this finger fits in one of several small notches 31. Thus, the cams are positively locked in place almost as securely as if they were made integral with the shaft and yet they can be easily removed and replaced. By having the shaft stepped as shown, it is not necessary to screw the adjusting nuts along the greater part of its length in order to secure the left hand cam in place.

The reduced end of the shaft which is journaled in the right hand bracket 12 has end thrust ball bearings 32 on opposite sides of the bracket and is held against longitudinal displacement by a nut 33 and a lock washer like the ones described above. However, an ordinary castellated nut may be used in this instance if it is so desired.

From the description of the cam assembly it will be understood that all of the cams, nuts, washers and the gear 22 are slipped on the shaft 13 after the small end thereof is pushed through the large opening in the left hand bracket. Moreover, the whole assembly is made before the face plate 10 is inserted and bolted in place.

The hand wheel 23 preferably has an indicator disc 34 on which is secured an annular sheet metal ring 35 having numbers or other suitable indicia to indicate the various speeds. Further, this disc preferably has a series of conical recesses 36 on its inner face cooperating with a spring urged pin or button 37 (Fig. 4) which acts as a stop for the different clutching positions of the hand wheel.

After the whole assembly is made, the plate is inserted on the lathe head and the cam grooves are guided over the heads of the pins 19; then, the plate is bolted in place. The cams may then be adjusted accurately to operate the clutch arms properly.

After the parts have become worn or if for any reason, some adjustment is required, the face plate may be removed and the position of any cam may be quickly changed by bending up the ears 30 of the washers 28 and turning the adjusting nuts in the proper direction. Further, there is not the least danger of the cams being accidentally misplaced as would be the case if they were merely keyed on the shaft in the usual way. Also, the parts can be made very economically and may be easily replaced at a relatively low cost.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. Control mechanism for the clutches of change speed mechanism for lathes or machine tools comprising, in combination, a face plate removably secured to the lathe head and having spaced integral inwardly extending brackets; a cam shaft journaled in said brackets; screw threaded portions on the shaft; a plurality of cams adjusted on and positively locked to said threaded portions; and manual means extending through the face plate to operate the cam shaft, said plate and all of said control mechanism being freely removable as a unit.

2. In a control unit for speed changing mechanism for lathes or machine tools, a cam shaft having spaced screw threaded portions of different diameters and longitudinal keyways; cams slipped on said screw threaded portions and keyed thereto; adjusting nuts on opposite sides of the cams; and an end thrust bearing at one end of the shaft.

3. In a controller for speed changing mechanism for lathes or machine tools, a cam shaft; a plurality of cams on the shaft each connected to operate a clutch; a control lever having a shaft geared to the cam shaft; a speed indicator disc secured to the lever shaft and having a plurality of recesses on one side a face plate having a bearing for said lever shaft; and a spring urged pin in said face plate adapted to engage said recesses when the lever is turned to different clutch shifting positions, all of said mechanism, including the face plate, being removable as a unit from the head of the machine.

4. A speed control unit for geared head lathes and the like comprising, in combination, a cam shaft mounted in the lathe head; a plurality of cams secured to the shaft and connected to actuate a series of yokes in proper sequence; bearing brackets at the opposite end portions of the cam shaft; a pair of anti-friction, end thrust bearing elements for the shaft arranged on opposite sides of one of said bearing brackets; and manual means extending through the lathe head connected to actuate said cam shaft.

In testimony, that I claim the foregoing as my own, I have hereto affixed my signature.

ALFRED C. GETZ.